United States Patent
Koli et al.

(10) Patent No.: US 10,353,588 B1
(45) Date of Patent: Jul. 16, 2019

(54) MANAGING DYNAMIC RESOURCE RESERVATION FOR HOST I/O REQUESTS

(71) Applicant: EMC Corporation, Hopkinton, MA (US)

(72) Inventors: Milind Koli, Morrisville, NC (US); Timothy C. Ng, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/199,975

(22) Filed: Jun. 30, 2016

(51) Int. Cl.
G06F 12/00 (2006.01)
G06F 3/06 (2006.01)

(52) U.S. Cl.
CPC ............ G06F 3/061 (2013.01); G06F 3/0655 (2013.01); G06F 3/0688 (2013.01)

(58) Field of Classification Search
CPC .. G06F 12/00; G06F 12/0238; G06F 12/0246; G06F 3/0679
USPC ................................................. 711/100, 154
See application file for complete search history.

(56) References Cited

U.S. PATENT DOCUMENTS

| | | | |
|---|---|---|---|
| 6,047,294 A | 4/2000 | Deshayes et al. | |
| 6,141,773 A | 10/2000 | St. Pierre et al. | |
| 7,363,418 B1 | 4/2008 | Westin et al. | |
| 7,568,051 B1 | 7/2009 | Linstead | |
| 7,886,298 B2 | 2/2011 | Lubbers et al. | |
| 8,380,931 B2 | 2/2013 | Rajvanshy et al. | |
| 8,775,718 B2 | 7/2014 | Kanevsky et al. | |
| 8,799,534 B2 | 8/2014 | Komikado | |
| 8,874,835 B1 * | 10/2014 | Davis | G06F 3/0679 711/103 |
| 8,990,527 B1 | 3/2015 | Linstead | |
| 9,274,937 B2 | 3/2016 | Batwara et al. | |
| 9,454,368 B2 | 9/2016 | Vaghani et al. | |
| 9,483,186 B1 | 11/2016 | Lewis et al. | |
| 9,495,189 B2 | 11/2016 | Shu et al. | |
| 9,575,685 B1 | 2/2017 | Linstead | |

(Continued)

OTHER PUBLICATIONS

Cormac Hogan, "VMware vSphere Storage APIs—Array Integration (VAAI)," Technical Marketing Documentation, Dec. 2012, Version 1.1, 19 pages.

(Continued)

*Primary Examiner* — Tuan V Thai
(74) *Attorney, Agent, or Firm* — BainwoodHuang

(57) ABSTRACT

In a data storage system a host I/O request is received from a host-side interface, the host I/O request specifying a range of logical block addresses (LBAs) of a mapped logical unit (MLU). Mapping information is obtained for a plurality of extents of the underlying logical units of storage. If there are a sufficient number of free sub-I/O request tracking structures to track completion of a plurality of respective sub-I/O requests for the extents, then the sub-I/O requests are concurrently issued to the device-side interface, using the mapping information. Upon receiving transfer initiation responses for the sub-I/O requests to initiate transfer of the respective extents, they are forwarded to the host-side interface to cause the respective extents to be transferred to/from the host. As the transfer initiation responses are forwarded to the host-side interface, the respective sub-I/O request tracking structures are freed for use in processing subsequent host I/O requests.

18 Claims, 10 Drawing Sheets

(56) References Cited

U.S. PATENT DOCUMENTS

| | | | |
|---|---|---|---|
| 9,715,351 | B2 | 7/2017 | Patocka |
| 9,983,896 | B1 | 5/2018 | Naik et al. |
| 10,025,510 | B1 | 7/2018 | Koli et al. |
| 10,037,289 | B1 | 7/2018 | Koli et al. |
| 10,061,540 | B1 | 8/2018 | Koli et al. |
| 10,146,454 | B1 | 12/2018 | Koli et al. |
| 2009/0300277 | A1* | 12/2009 | Jeddeloh ............ G06F 12/0246 711/104 |
| 2010/0106889 | A1* | 4/2010 | Manning ............ G06F 11/2069 711/103 |
| 2010/0174851 | A1* | 7/2010 | Leibowitz ............ G06F 3/0616 711/103 |
| 2010/0262727 | A1 | 10/2010 | Arndt |
| 2011/0035548 | A1* | 2/2011 | Kimmel .................. G06F 3/061 711/114 |
| 2011/0173484 | A1* | 7/2011 | Schuette ............ G06F 11/0727 714/2 |
| 2011/0197014 | A1* | 8/2011 | Yeh .................... G06F 12/0246 711/103 |
| 2014/0122774 | A1* | 5/2014 | Xian .................. G06F 12/0246 711/103 |
| 2015/0039815 | A1 | 2/2015 | Klein |

OTHER PUBLICATIONS

Microsoft, "I/O request packets," Jul. 11, 2015, downloaded from https://web.archive.org/web/20150711194252/https://msdn.microsoft.com/en-us/library/windows/hardware/hh439638(v=vs.85).aspx.
"Working Draft SCSI Extended Copy Command," Apr. 2, 1999, T10/99-143r1, 34 pages.

* cited by examiner

SIOTS RESERVATION FOR WRITE

MANAGING DYNAMIC RESOURCE RESERVATION FOR HOST I/O REQUESTS

TECHNICAL FIELD

The present invention relates to data storage systems.

BACKGROUND OF THE INVENTION

In data storage systems it is known to employ so-called "mapped" logical storage units or MLUs. An MLU is presented to a host computer as a conventional logical storage unit or LUN, i.e., as consisting of a linear array of blocks of storage and having a device (LUN) identifier that enables a host computer to issue I/O requests to write and read data to/from the MLU. Within the data storage system, however, the MLU is mapped to underlying storage in a more arbitrary way in order to provide certain functional and/or performance advantages. In one example an MLU is a so-called "thin" LUN or TLU for which the underlying storage is allocated only on an as-needed basis. Use of TLUs can provide for more efficient use of physical storage resources. At any given time, one or more logical areas or ranges of the MLU have no underlying storage associated therewith, while other logical areas or ranges do. When a host I/O request directed to an MLU is received at a data storage system, it is necessary to map a range of blocks of the request to one or more distinct units of underlying storage, and then to perform the requested operation on the mapped units of underlying storage.

SUMMARY OF THE INVENTION

In a data storage system a host I/O request is received from a host-side interface, the host I/O request specifying a range of logical block addresses (LBAs) of a mapped logical unit (MLU). Mapping information is obtained for a plurality of extents of the underlying logical units of storage. If there are a sufficient number of free sub-I/O request tracking structures to track completion of a plurality of respective sub-I/O requests for the extents, then the sub-I/O requests are concurrently issued to the device-side interface, using the mapping information. Upon receiving transfer initiation responses for the sub-I/O requests to initiate transfer of the respective extents, they are forwarded to the host-side interface to cause the respective extents to be transferred to/from the host. As the transfer initiation responses are forwarded to the host-side interface, the respective sub-I/O request tracking structures are freed for use in processing subsequent host I/O requests.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
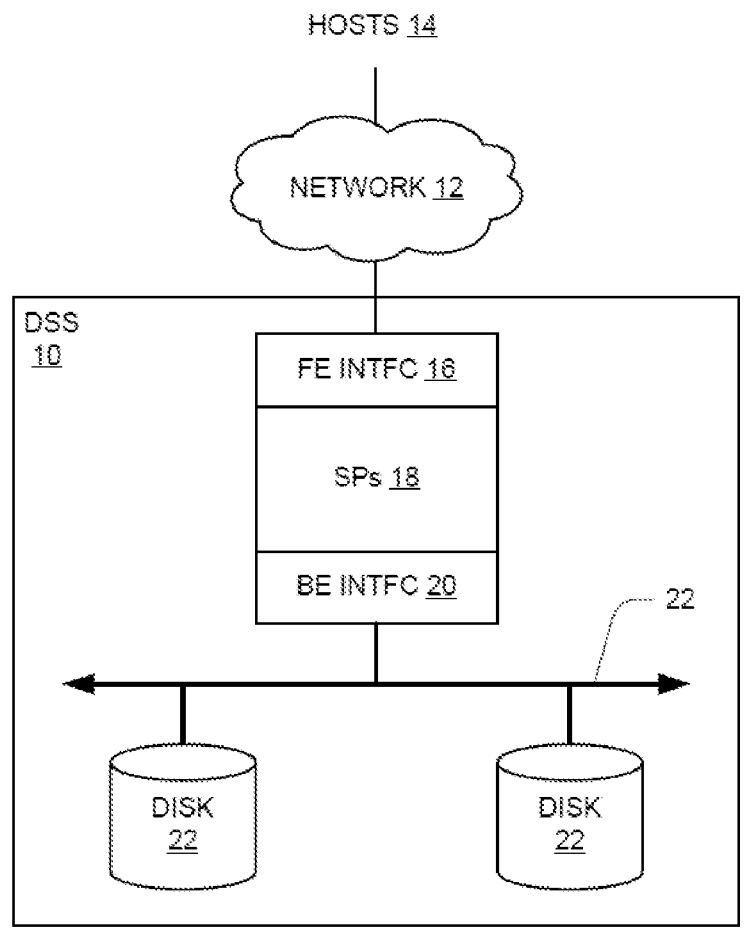
FIG. 1 is a block diagram of a computer system.

FIG. 1 shows a computer system in which a data storage system (DSS) 10 is connected to a network 12 to which a plurality of host computers or hosts 14 are connected. The data storage system 10 includes front-end interface circuitry (FE INTFC) 16 connected to the network 12, a set of storage processors (SPs) 18, and back-end interface circuitry (BE INTFC) 20 connected to disks 22 of the data storage system 10 by a storage-oriented interconnection 24 such as one or more FibreChannel links, etc.

In operation, the hosts 14 generate storage I/O requests and issue them to the data storage system 10 via the network 12. In one embodiment, the I/O requests employ a standardized storage access protocol such as SCSI and are block-oriented requests, i.e., requests for sets of fixed-sized blocks of a disk-like logical storage device presented to the hosts 14 by the data storage system 10. These requests include read and write requests, each typically specifying a range of logical block addresses (LBAs) in terms of a starting LBA and a length value indicating the number of blocks to be transferred. In this case the network 12 may be a storage-oriented network such as a FibreChannel storage area network (SAN), or the system may use a technology such as iSCSI over a conventional communications network such as a TCP/IP network. In an alternative embodiment, the I/O requests are file-oriented requests directed to files of a network file system that are presented to the hosts 14 by the data storage system 10. In this case the network 12 is typically a communications network such as a TCP/IP network, and the data storage device 10 may be referred to as a "network attached storage" or NAS system. The present description refers primarily to the block-oriented application, but the techniques described herein are applicable for use in a file-oriented application.

The FE interface 16 is responsible for handling requests and responses to/from the hosts 14, including transfer of read data responsive to a read request and transfer of write data as part of processing a write request. The BE interface 20 functions as an initiator with respect to the disks 22, generating read and write I/O requests, providing data as part of the write I/O requests, and accepting returned data as part of the read I/O requests. The SPs 18 perform processing to provide a variety of functions, including for example a logical translation between host-facing logical units of storage and corresponding physical units of storage defined on the disks 22. At a high level such functionality is generally known in the art and not elaborated herein. The present description focuses on particular functionality not known in existing systems.

Figure 2:
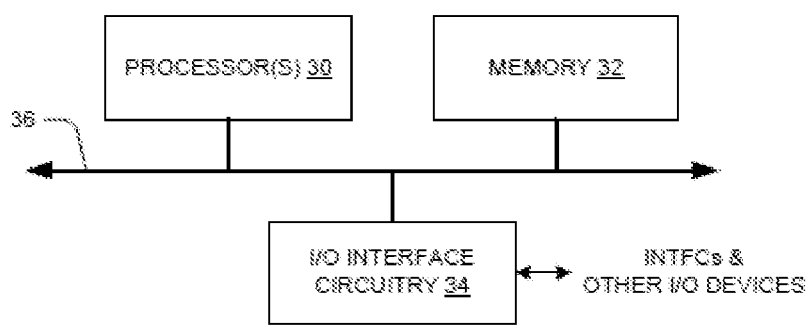
FIG. 2 is a block diagram of a computer from a hardware perspective.

FIG. 2 shows an example configuration of a physical computer such as an SP 18 from a computer hardware perspective. The hardware includes one or more processors 30, memory 32, and interface circuitry 34 interconnected by data interconnections 36 such as one or more high-speed data buses. The interface circuitry 34 provides a hardware connection to the FE and BE interfaces 16, 20 (FIG. 1) and perhaps other external devices/connections (EXT DEVs). The processor(s) 30 with connected memory 32 may also be referred to as "processing circuitry" herein. For non-volatile secondary storage, the hardware may carve out and utilize private portions or partitions of a disk 22. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, for example, can be referred to as a data storage circuit or data storage component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
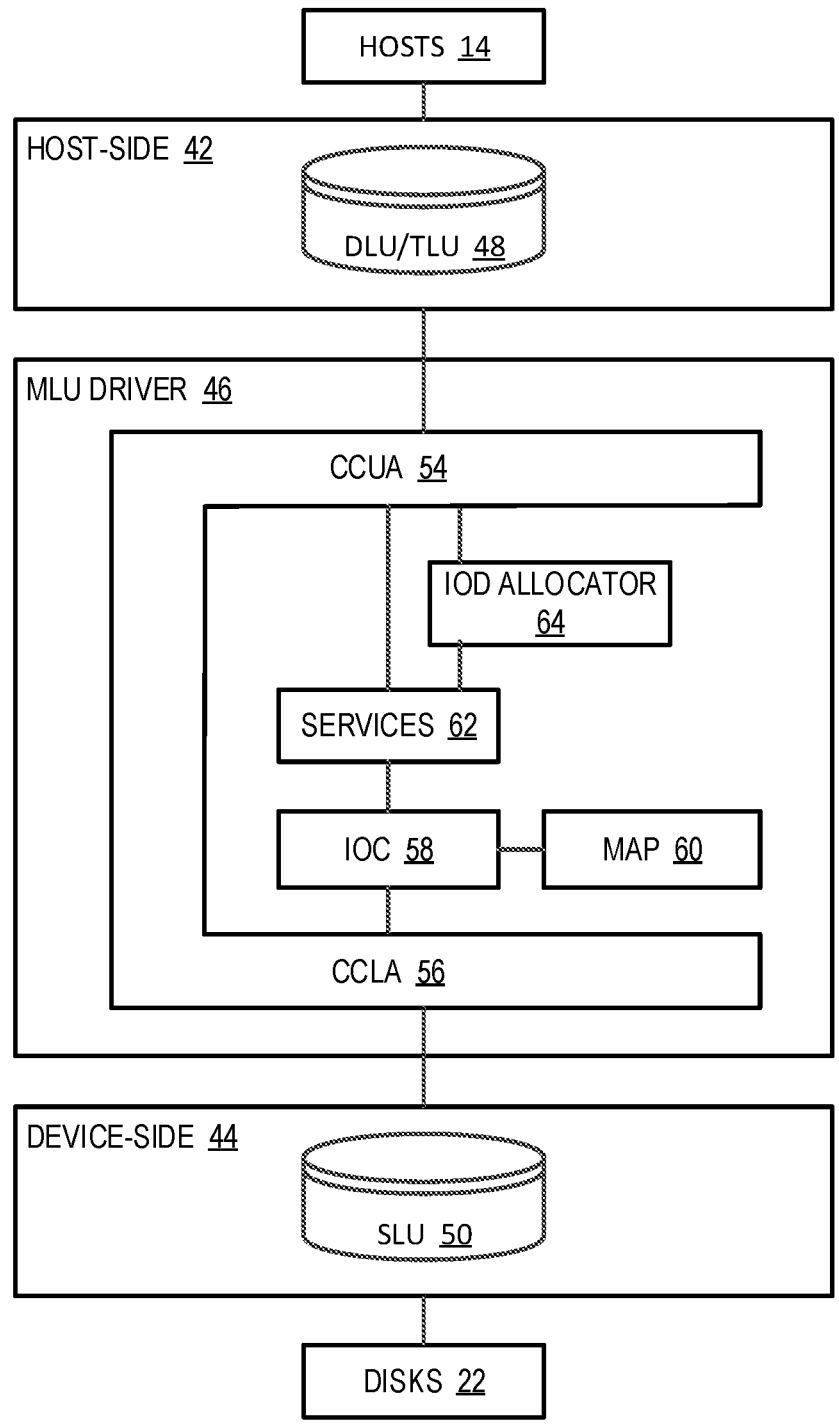
FIG. 3 is a schematic diagram of an organization of software-implemented components in a data storage system.

FIG. 3 shows an organization 40 of an SP 18 in use, i.e., when executing operating software to realize functional components or modules as generally known in the art. The organization 40 includes a host-side interface 42, a device-side interface 44, and a "mapped logical unit" (MLU) driver 46. The logical storage devices presented to the hosts 14 are shown as a direct logical unit or a thin logical unit (DLU/TLU) 48, and the units of storage provided by the disks 22 are represented as system logical units (SLUs) 50. The MLU driver 46 provides a framework to create a pool of storage which is a collection of actual physical storage SLUs. A user (e.g., storage administrator) can then create DLUs and TLUs in that pool. In one embodiment the SLUs 50 may be realized as so-called FLARE LUNs such as used in systems sold by EMC Corporation.

The MLU driver 46 includes a wrapper type of component referred to as a "C clamp" 52, having a C clamp upper arm (CCUA) 54 and a C clamp lower arm (CCLA) 56. Core components include an I/O coordinator (IOC) 58, a mapping library (MAP) 60, and one or more service components 62. In this context, "service" refers to extended or value-added storage functionality such as data compression, deduplication, etc. In one embodiment, the mapping library 60 can be realized using an embedded block file system such as the Common Block File System (CBFS) used in products of EMC Corporation.

The device-side interface 44 may have considerable complexity in some embodiments. For example, it can include any/all of a memory-based storage cache (i.e., DRAM cache), storage tiering including use of Flash memory, and a redundant array of independent disks (RAID) controller. Configurations of this type are generally known and not elaborated further. Specific relevant functionality of the device-side interface 44 is included as part of certain overall operations as described below.

In operation utilizing the organization 40 of FIG. 3, an SP 18 receives host I/O requests at the host-side interface 42, performs various functions within the MLU driver 46, and accesses the disks 22 to transfer data in satisfaction of the requests. It will be appreciated that the use of a cache within the device-side interface 44 has a decoupling effect, i.e., that host I/O requests are satisfied from the cache at a very high rate, and that the disks 22 are accessed for cache misses on reads as well as and on cache flushes. More particularly, a host I/O request is received from the host-side interface 42 at the CCUA 54, passes through the services 62 to IOC 58, then on to CCLA 56 which works in connection with the device-side interface 44 to satisfy the requests. As part of processing requests, the IOC 58 accesses the mapping library 60 to obtain mapping information that translates between the host-facing DLU/TLU 48 and the disk-facing SLU 50. For ease of description herein the services 62 are treated as "no-operation" or pass-through components. Those skilled in the art will appreciate how details may be added or varied to reflect the addition of one or more services.

Figure 4:
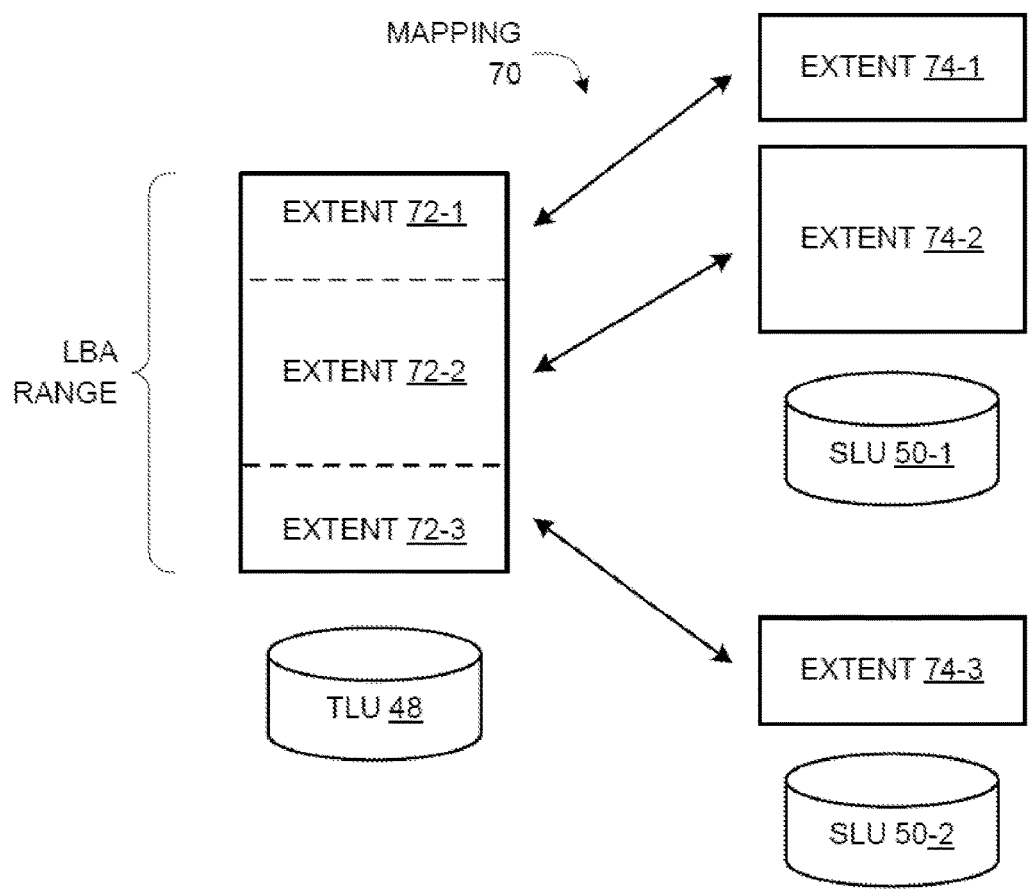
FIG. 4 is a schematic diagram for a mapping from a range of addresses of a host-visible logical unit of storage to extents of underlying system logical units of storage.

FIG. 4 illustrates a mapping 70 such as described above and maintained by the mapping library 60. On the left is a range of LBAs of a TLU 48 as visible to a host 14. As shown, it is logically divided into three sub-ranges or "extents" 72 (shown as 72-1, 72-2 and 72-3), and each of these is mapped via the mapping 70 to a respective extent 74 of a respective SLU 50 provided by the device-side interface 44. In particular, the extents 72-1 and 72-2 are mapped to extents 74-1 and 74-2 on a first SLU 50-1, and the extent 74-3 is are mapped to an extent 74-3 on a second SLU 50-2. The extents 74-1 and 74-2 are not necessarily contiguous on SLU 50-1.

Given the mapping 70, it will be appreciated that a host I/O request directed to the TLU 48 generally involves accessing one or more of the extents 74 and SLUs 50, depending of course on the mapping 70. For purposes of this description the mapping 70 of FIG. 4 is used to present an example of processing of an I/O request for the entire range of blocks made up by extents 72-1 through 72-3. This processing occurs within the MLU driver 46, with particular involvement of the IOC 58 as described more below. Those skilled in the art will appreciate that this example is non-limiting and illustrates more general aspects of operation for more arbitrary host I/O requests.

Returning briefly to FIG. 3, the host side interface 42 initiates only one internal I/O request for each host I/O request it receives; it is up to other components including the MLU driver 46 and device-side interface 44 to perform control operations needed to initiate transfer of separate extents 74 that are needed for a given request. The host-side interface 42 is not aware of the specific mapping that is maintained by the mapping library 60 for the data of any particular host I/O request. The host-side interface 42 can handle a data transfer phase that is broken into different parts for respective extents 72, but it requires that the extents 74 be transferred in address order. Thus, the MLU driver 46 manages underlying data transfers to provide the ordering required by the host-side interface 42.

Another feature of the organization 40 is its use of so-called "data copy avoidance" or DCA technique by which data is transferred to/from the host/side interface 42. Rather than physically copying data among different memory buffers as part of the transfer, the data of an I/O request is maintained within one buffer and is transferred logically by the transfer of pointers to the data. In the case of a write, for example, write data is stored in a memory buffer by the host-side interface 42 and then transferred directly from the memory buffer to the storage cache within the device-side interface 44 through manipulation of the associated pointers. A read is handled in an analogous manner. In the context of MLUs, however, the memory buffer is a single logical buffer that includes multiple sub-buffers for the underlying extents 74, and these sub-buffers are logically ordered according to the sequence in which they are filled or emptied as part of the transfer with the device-side interface 44. As described more below, this aspect of the host-side interface 42 can require re-ordering of the transfer of extents so that the ordering of the sub-buffers mirrors the logical or address ordering of the extents.

Figure 5:
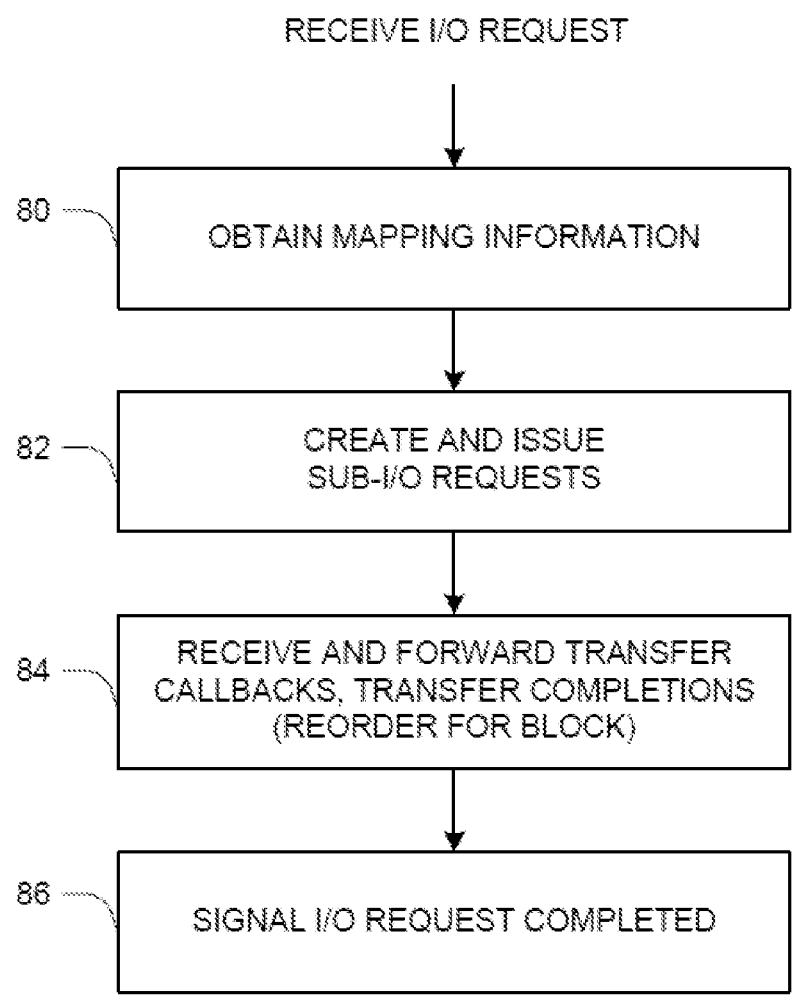
FIG. 5 is a flow diagram of operation of a mapped logical unit (MLU) driver in a data storage system.

FIG. 5 describes operation of the MLU driver 46 in connection with a host I/O request received from the host-side interface 42. At 80, the IOC 58 obtains mapping information for the request by consulting the mapping library 60. Generally, this step requires the IOC 58 to extract the starting LBA request and length from the I/O request and provide them to the mapping library 60, then await the return of the mapping information. Using the example of FIG. 4, the mapping library 60 maintains the map 70 that translates between the LBA range of the I/O request (the three extents 72) and the underlying extents 74 and SLUs 50. In this case, the mapping library 60 returns three mapping values:

(Extent 74-1, SLU 50-1)
(Extent 74-2, SLU 50-1)
(Extent 74-3, SLU 50-2)

The mechanism for returning multiple mapping values is of particular note as explained below. The extents 74 may be identified by starting LBA and length, or some other suitable way. The SLUs 50 are identified by a logical unit name or number, usable in a SCSI command to identify a logical unit of storage being accessed.

At 82, the IOC 58 responds to the return of the three mapping values by creating and issuing respective requests for the extents to CCLA 56, which in turn issues three corresponding sub-I/O requests to the device-side interface 44. These are generally issued in parallel, but some serialization may occur under certain conditions as explained more below. It may be preferable that the sub-I/O requests be issued in address order, e.g., requesting extents 74-1, 74-2 and 74-3 in order. This operation is describe in an example below.

At 84, the MLU driver 46 provides for exchange of transfer-related signaling between the device-side interface 44 and the host-side interface 42 to effect transfer of the data of the I/O request between these components. The signaling is performed using "callbacks" that are registered at the time a service or function is invoked. Two types of callbacks are involved. One is a transfer callback indicating that a transfer is to be initiated. That callback is received from the device-side interface 44, and a corresponding "start transfer" callback is conveyed to the host-side interface 42. The start transfer callback is also referred to as a transfer initiation response herein. Another type of callback is a transfer completed callback indicating that a transfer has been completed. That callback is received from the host-side interface 42, and a corresponding "transfer completed" callback is conveyed to the device-side interface 44. This signaling is described in more detail below.

During processing at 84, the MLU driver 46 monitors for successful completion of all sub-I/O requests. Once this occurs, then at 86 the MLU driver 46 signals to the host-side interface 42 that the processing for the host I/O request has been completed. At this point the host-side interface 42 takes appropriate corresponding action. In the case of a read I/O request, it initiates a read response to the host 14 containing the transferred data. In the case of a write I/O request, it initiates return of a "good" status indicating successful completion of the write.

Certain significant details of the processing of a single mapping callback operation as well as use of resources available for the single mapping operation are described further below.

Figure 6:
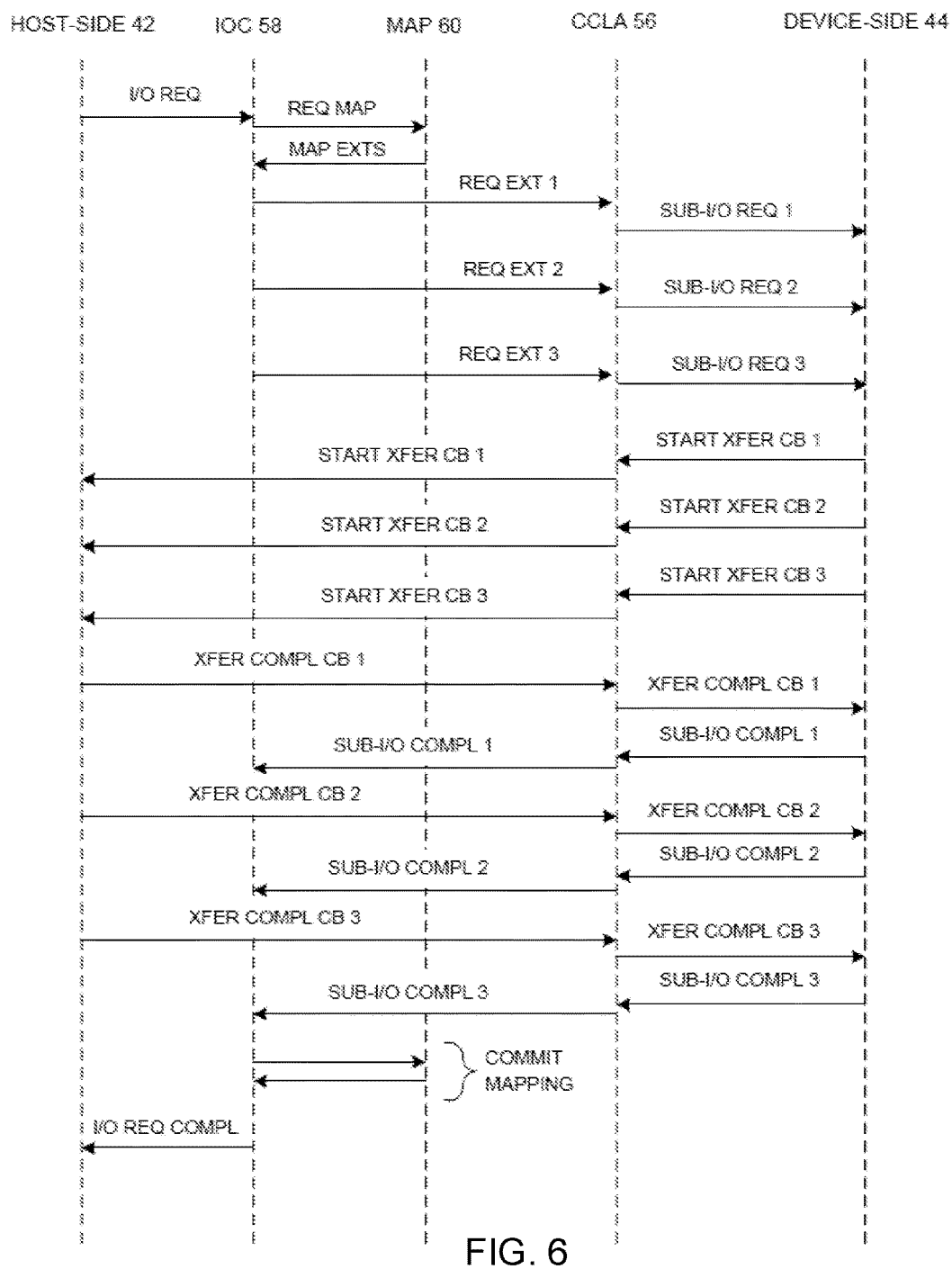
FIGS. 6 and 7 are sequence diagrams of operations involved in processing a host I/O request within a data storage system.
Figure 7:
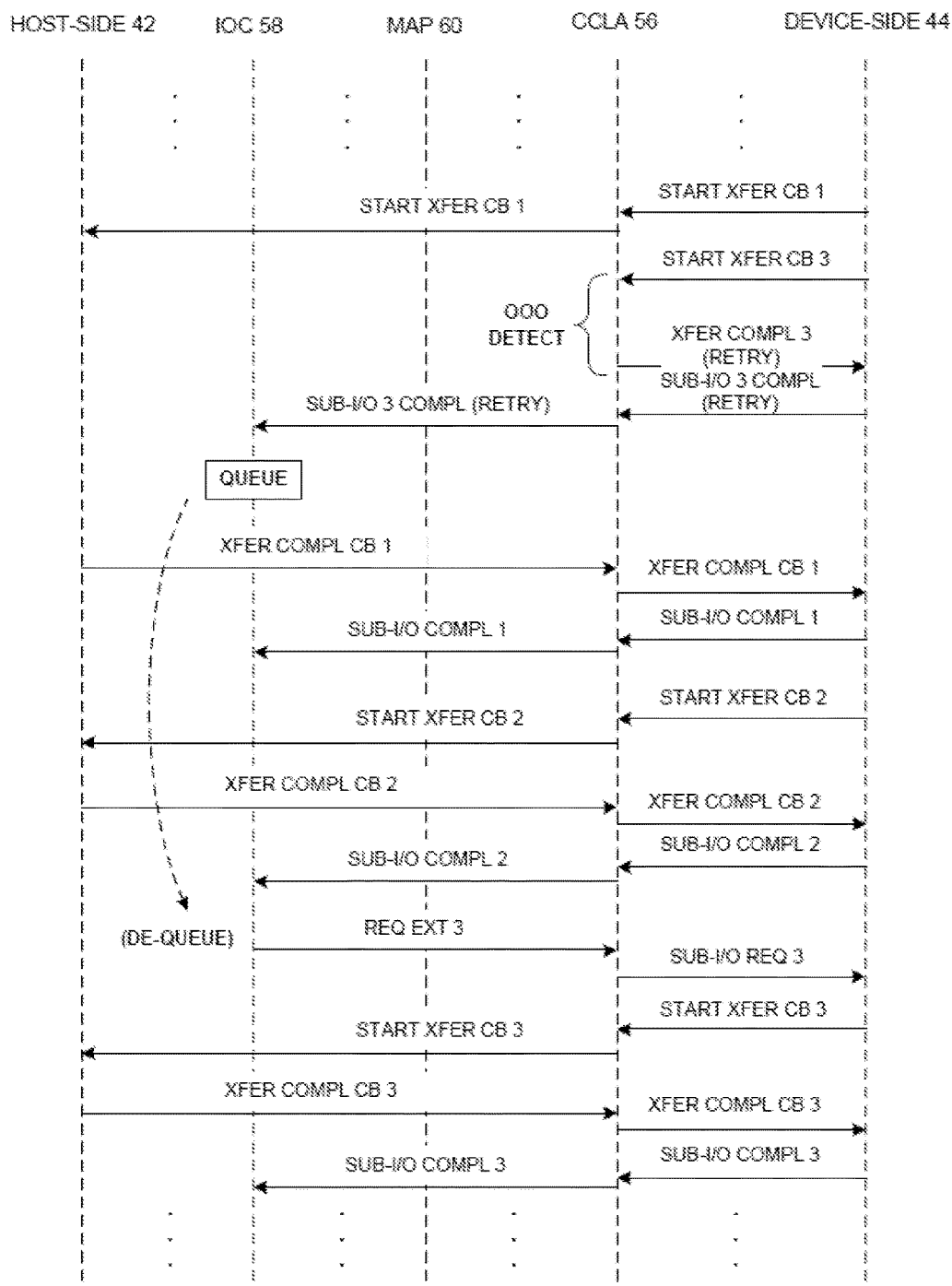

FIGS. 6 and 7 illustrate operation as it involves several components of the organization 40 of FIG. 3, namely the host-side interface 42, IOC 58, mapping library 60, CCLA 56 and device-side interface 44. Each of these is represented by a vertical line in these Figures. Although communications between the IOC 58 and host-side interface 42 may involve the CCUA 54, such involvement does not alter the fundamental operation and is omitted for simplicity. Also as mentioned any effect of a service 62 is also ignored. Horizontal lines with arrows in FIGS. 6 and 7 represent internal messages or operations. Some messages may be transferred using so-called I/O Request Packets or IRPs. Use of IRPs is generally known especially with respect to communicating I/O requests between functional layers of an I/O subsystem.

FIG. 6 describes a first scenario in which commands are processed free of errors and "in order", i.e., with the device-side interface 44 initiating transfer of the extents 74 in address order. Operation begins with a host I/O request (I/O REQ) received by the IOC 58 from the host-side interface 42. The IOC 58 requests and obtains the mapping of extents from mapping library 60 (REQ MAP, MAP EXTS). The mapping library 60 returns mappings for all extents 74 that underlie the LBA range of the I/O request. Assuming the example of FIG. 4, the MAP EXTS response includes the respective LBAs and lengths of the three extents 74-1, 74-2 and 74-3. In one embodiment, all mapping information is returned in a single response. This operation promotes efficiency by reducing messaging overhead, and it also enables the IO 58 to immediately initiate transfer of all the required extents, promoting good performance.

The IOC 58 then issues three separate requests for the identified extents to the CCLA 56 (REQ EXT 1, 2 and 3), which in turn generates three corresponding sub-I/O requests (SUB I/O REQ 1, 2 and 3) to the device-side interface 44. The sub-I/O requests are issued concurrently, i.e., in rapid succession without waiting for any of them to complete. The sub-I/O requests are fully formed requests consistent with the SLU-based representation of storage provided by the device-side interface 44. That is, they may be expressed in SCSI command descriptors and conveyed in IRPs, for example. The sub-I/O requests are issued in "address order", i.e., starting with the extent 74-1 that maps to the extent 72-1 at the beginning of the address range of the host I/O request, then to the next extent 74-2 that maps to the next extent 72-2 in the address range, etc.

When the device-side interface 44 is ready to engage in the data transfer phase of each sub-I/O request, it issues a corresponding start transfer callback (START XFER CB 1, 2, 3) to CCLA 56. For writes and cache-hit reads, this typically occurs immediately. For cache-miss reads the start of the transfer may be delayed by the time required to obtain the extent from a disk 22. In the example of FIG. 6, all three callbacks occur immediately and in address order. The CCLA 56 responds by issuing corresponding start transfer callbacks to the host-side interface 42 (START XFER CB 1, 2 and 3); each of these initiates a transfer of a respective extent. For writes, each extent is transferred from the host-side interface 42 to the device-side interface 44, i.e. to the storage cache therein. For reads, each extent is transferred from the device-side interface 44 (e.g., from the storage cache) to a corresponding buffer of the host-side interface 42. From the perspective of the device-side interface 44, each transfer is a discrete operation independent of the others and may be performed out of order. However, from the perspective of the host-side interface 42 the transfers are portions of an overall data transfer for the host I/O request, and must be performed in address order.

As part of the above operation, the CCLA 56 is monitoring for the in-order occurrence of the start-transfer callbacks from the device-side interface 44. In the illustrated example, this order is 1, 2 and 3 for the extents 74-1, 74-2 and 74-3 respectively. Because the order is maintained in the example of FIG. 6, the transfers can be signaled to the host-side interface 42 as the signaling is received from the device-side interface 44. If it is detected that the start-transfer callbacks occur out of order, then processing is different, as is explained below using another example with reference to FIG. 7.

Finally in the process of FIG. 6, when each transfer is completed the host-side interface 42 issues a corresponding transfer completed callback (XFER COMPL CB 1, 2 and 3) which the CCLA 56 essentially forwards to the device-side interface 44. In response the device-side interface 44 issues corresponding sub-I/O completed messages to CCLA 56 (SUB-I/O COMPL 1, 2 and 3), which are forwarded on to IOC 58. The IOC 58 monitors for successful completion of all the sub-I/O requests, and upon receiving the sub-I/O completed messages for all sub-I/O requests the IOC 58 performs two final tasks. For both reads and writes, it engages in a "commit mapping" exchange with the mapping library 60, informing the mapping library 60 that the I/O request is successfully completed and thus the mapping can be used for subsequent access to the data. The IOC 58 also issues an overall I/O request completion message (I/O REQ COMPL) to the host-side interface 42, which uses this indication to return an appropriate response to the host 14 that issued the I/O request. For a write, this response will be a "good" status indicating successful completion of the write. For a read, this response will be a return of the requested data.

FIG. 7 illustrates an out-of-order example. Up to the point of the first start-transfer callback (START XFER CB 1), processing is the same as in FIG. 6. This is indicated by the vertical ellipses at the top of the flow. However, the next start-transfer callback from the device-side interface 44 is for the third extent 74-3 rather than the second extent 74-2. As shown, the CCLA 56 identifies this out-of-order (OOO) condition and alters the signaling. It first issues a transfer completion signal with a "retry" status (XFER COMPL 3) to the device-side interface 44, indicating that the transfer for the third extent 74-3 is being aborted and will be retried later. The device-side interface 44 responds with a sub-I/O completion message with a "retry" status (SUB-I/O COMPL 3), which is forwarded to the IOC 58. The IOC 58 responds by queuing a retry of the third sub-I/O request.

In the illustrated example the transfer for the first extent 74-1 then completes, similar to the example of FIG. 6, and this is followed by the transfer for the second extent 74-2 which is initiated when the device-side interface 44 issues the start-transfer callback for it (START XFER CB 2). The IOC 58 monitors for completion of sub-I/O request 2 as indicated by the sub-I/O completion message (SUB-I/O COMPL 2). At that point, the IOC 58 de-queues the previously queued third sub-I/O request and re-initiates it by sending a new request for the third extent (REQ EXT 3). In this example the rest of the transfer process for the third extent 74-3 proceeds normally, and upon completion the IOC 58 engages in the commit mapping exchange with the mapping library 60 and returns the overall I/O request completion message to the host-side interface 42 as described with reference to FIG. 6. This is indicated by vertical ellipses at the bottom of the flow.

In the example of FIG. 7 only one sub-I/O request is aborted and then retried later. In general there may be more than one attempted transfer that is identified as out-of-order and thus requires queuing and retrying later. The IOC 58 may issue such multiple queued sub-I/O requests in a parallel fashion similar to the manner of issuing the initial requests in parallel. Typically such retried sub-I/O requests would be expected to be cache hits and thus be completed in order. However, if requests are issued in parallel then it is still necessary to perform OOO detection and to re-order as may be necessary, using the mechanism described above with reference to FIG. 7. Alternatively, the IOC 58 may enforce serial execution of any retried sub-I/O requests, i.e., only initiating one when all those preceding have fully completed as indicated by receiving the respective sub-I/O completion messages. A hybrid approach could be to retry in parallel for a first OOO detection for a given sub-I/O request, and then switching to serial retrying if there are any subsequent additional OOO detections for the same or even a different sub-I/O request. Switching to serial processing can help ensure progress and completion, avoiding deadlocks or other undesirable operating conditions.

The above parallel processing of multiple sub-I/O requests for a given host I/O request is not necessarily exclusive of also using serial processing if and when appropriate. Serial processing may be preferred for some types of mapping extents, for example, so the type of processing can be conditioned on whether or not the mapping extents are of such type. In some embodiments, the use of parallel versus serial processing may be selectable in some manner, so parallel processing would only occur in a selected parallel-processing mode of operation. Another possible alternative is the manner of aborting in-progress sub-I/O requests when an OOO situation is detected. In the illustrated embodiment this occurs at the beginning of the data transfer phase. In an alternative embodiment, the aborting and retrying may occur later, even as late as the completion of the sub-I/O request.

While the re-ordering of the transfers for sub-I/O requests as described above includes an "abort" of the transfer of a previously initiated sub-I/O request, the abort is a normal occurrence given non-zero cache miss rates and is followed by re-initiating the affected sub-I/O request later to achieve the desired ordering of the transfers. There can also be abnormal situations that need to be handled appropriately given the possibility of multiple parallel sub-I/O requests outstanding at the same time. Two such situations are cancellation and errors. Many systems permit an initiator of an I/O operation to cancel that operation. If a host I/O request is cancelled, it is necessary to cancel uncompleted sub-I/O requests. For the sake of coherence, this is done in a serial rather than parallel fashion. An example is used to illustrate. If a host I/O request is broken into 5 sub-I/O requests and the first two have completed at the time of cancellation, then the MLU driver 46 cancels the remaining three in order. It first waits for the start transfer callback for the third sub-I/O request and responds to the device-side interface 44 with a transfer complete message, similar to the situation of OOO detection as described with reference to FIG. 7, except that the "retry" indication is not made. This signals to the device-side interface 44 that the sub-I/O request is cancelled. The device-side interface 44 responds with the sub-I/O completed callback, which is used by the IOC 58 to clear any remaining state for the sub-I/O request. The IOC 58 then initiates cancellation of the next sub-I/O request, e.g. the fourth in this example, and the process is repeated serially until the last sub-I/O request has been cancelled. Errors can be handled in a similar fashion. If an error is encountered that makes it unnecessary to complete the remaining processing for a host I/O request, the outstanding sub-I/O requests can be cancelled using the same process. Cancellations and errors are also referred to as "interrupting events" herein due to their effect of interrupting normal processing.

Extension to File I/O

As mentioned, the disclosed technique can be applied to file I/O as initiated from the hosts 14 to the data storage system 10 configured as a network attached storage (NAS) server. The I/Os from the NAS server may be separately buffered within the data storage system 10, and if so then the order in which such buffers are filled (for reads) or emptied (for writes) is not important, as the buffers are logically transferred as complete units. Thus for file I/O it may not be required that the transfers for the sub-I/O requests be performed in order at the host-side interface 42, which means that the requirement for OOO detection and reordering such as described above can be relaxed. There can still be performance benefits to the features of receiving all mapping information in one mapping callback and in issuing multiple sub-I/O requests concurrently (in parallel) rather than serially, so these features may still be employed even though the order enforcement feature is not.

Another feature that may be used in some embodiments is implementation of separate "fast" and "slow" lookup paths in the mapping library 60, to more efficiently support mixes of device types. Specifically, for a direct-mapped LUN (DLU), a lookup for a given LBA range of a host I/O request always returns a corresponding single range on an underlying SLU (i.e., starting LBA to which the starting LBA of the DLU-referenced request is mapped). This is in contrast to thin LUNs (TLUs) for which there may be an arbitrary number of distinct extents 74 that provide the underlying storage for a given LBA range of the TLU. The mapping library 60 may be designed with separate structures and lookup mechanisms for the two type of lookups. Because the direct-mapped lookup for DLUs is simple, it is also fast, and hence this type of lookup can be viewed as a "fast path" lookup in contrast to the more complex and thus slower "slow path" lookup for TLUs.

One significance of the use of the fast/slow path structuring of the mapping library 60 is the effect of the use of "snapshots" or point-in-time copies of production LUNs. Even for DLUs, snapshotting almost always employs thin-LUN techniques that describe snapshots as differences or "deltas" from the current production LUN contents. Thus when a DLU is "snapped", i.e., has a snapshot created, the mapping becomes more like the mapping for TLUs. A lookup on the fast path for a DLU might be responded to with an indication that it should be retried on the slow path, in which case the IOC 58 must be able to switch to using multiple sub-I/O requests as described above rather than expecting a single mapping value and simply issuing one I/O request to a direct-mapped extent.

As noted above, there are noteworthy details of the processing of FIG. 5. While the single mapping response with a listing of all required extents promotes efficiency, it is still important that the multiple operations for the various extents (FIGS. 6 and 7) be performed reliably and efficiently as possible. The IOC 58 employs sub-I/O tracking structures or SIOTS to internally track the completion of the respective sub-I/O requests for the extents needed to fulfill each host I/O request. The SIOTS are themselves resources that require management and efficient utilization. The IOC 58 employs resource allocation intelligence for this purpose. In one embodiment, the IOC 58 uses the so-called "banker's algorithm" for such resource allocation. The banker's algorithm promotes not only efficiency but also safety by avoidance of deadlocks.

Since all the extent information is available in a single mapping operation the IOC 58 makes more intelligent decisions about underlying SIOTS allocation. There is also the opportunity for increased parallelism. With the single mapping operation the IOC 58 can accurately predict the number of SIOTS required for a host I/O request to be processed without getting blocked/queued. Once a mapping response has been received and thus the number of extents needed for a given host I/O request is known, the IOC 58 begins the processing for the extents only after successfully reserving a corresponding number of SIOTS. If initially there are not a sufficient number of SIOTS available, then the IOC 58 simply waits for SIOTS to be freed up by completion of previously initiated requests, and once the required number are available they are reserved and used for obtaining the extents for the new host I/O request. As the processing of each extent is completed, the corresponding SIOTS is freed up to be available for processing subsequent host I/O requests.

Figure 8:
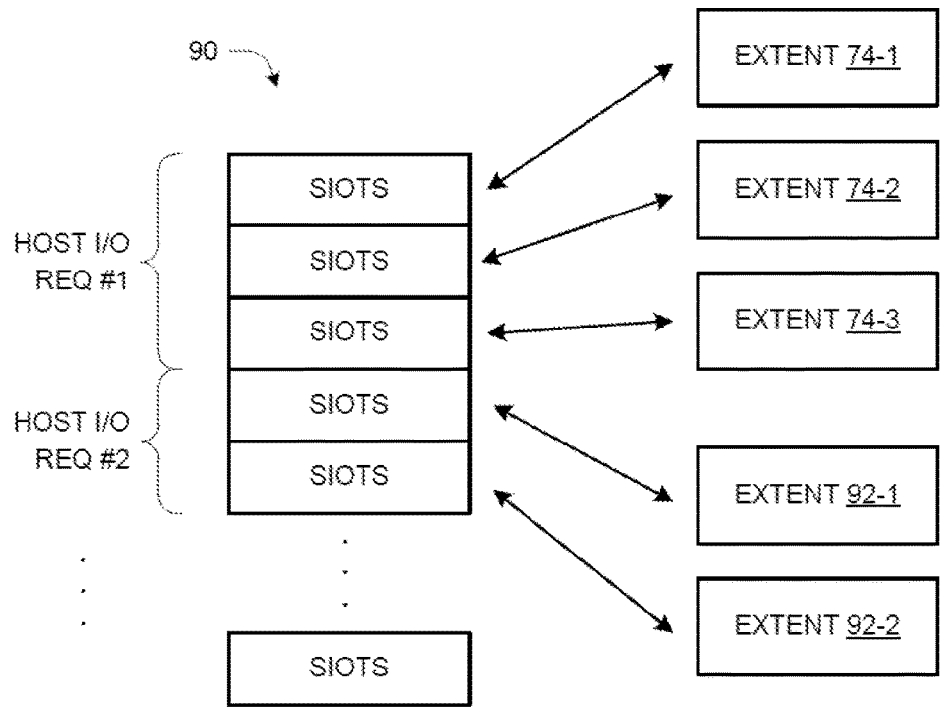
FIG. 8 is a schematic diagram of a collection of sub-I/O request tracking structures.

The above is more fully described with reference to FIGS. 8 and 9. The collection of SIOTS is shown at 90. In this example, three SIOTS have been allocated for processing the sub-I/O requests (for extents 74-1 through 74-3) for a first host I/O request. Two additional SIOTS have been allocated for processing the sub-I/O requests (for extents 92-1 and 92-2) for a second host I/O request. As each sub-I/O request completes, the corresponding SIOTS is freed up to be available to be allocated for processing another sub-I/O request, generally of another host I/O request.

Figure 9:
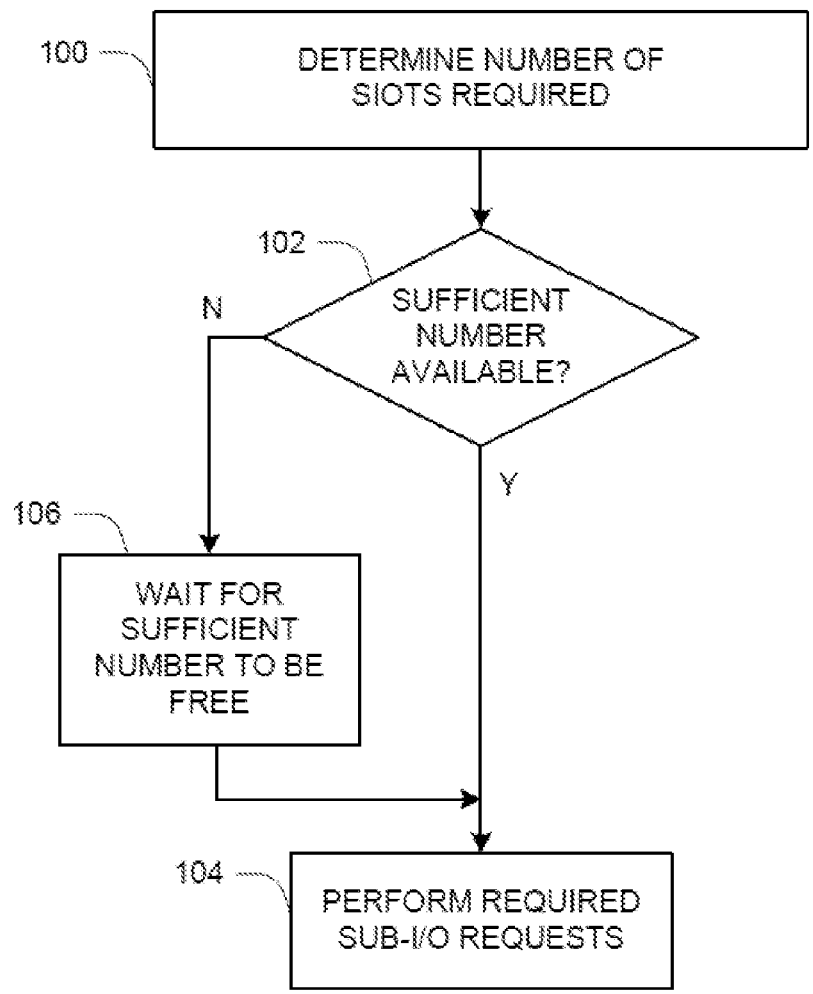
FIG. 9 is a flow diagram describing use of the sub-I/O request tracking structures in connection with processing a host I/O request.

FIG. 9 shows the logic associated with use of the SIOTS 90 in connection with a single host I/O request, which is part of (p/o) the processing of step 82 described above with reference to FIG. 5. At 100, it is determined how many SIOTS are required, which corresponds to the number of extents identified in the mapping response. At 102, it is determined whether there are a sufficient number of free SIOTS available. If so, then at 104 the sub-I/O requests for the host I/O request are all performed, as described above. If not, then at 106 the processing waits for the sufficient number of SIOTS to become available, and then proceeds to step 104 to process all the sub-I/O requests.

Figure 10:
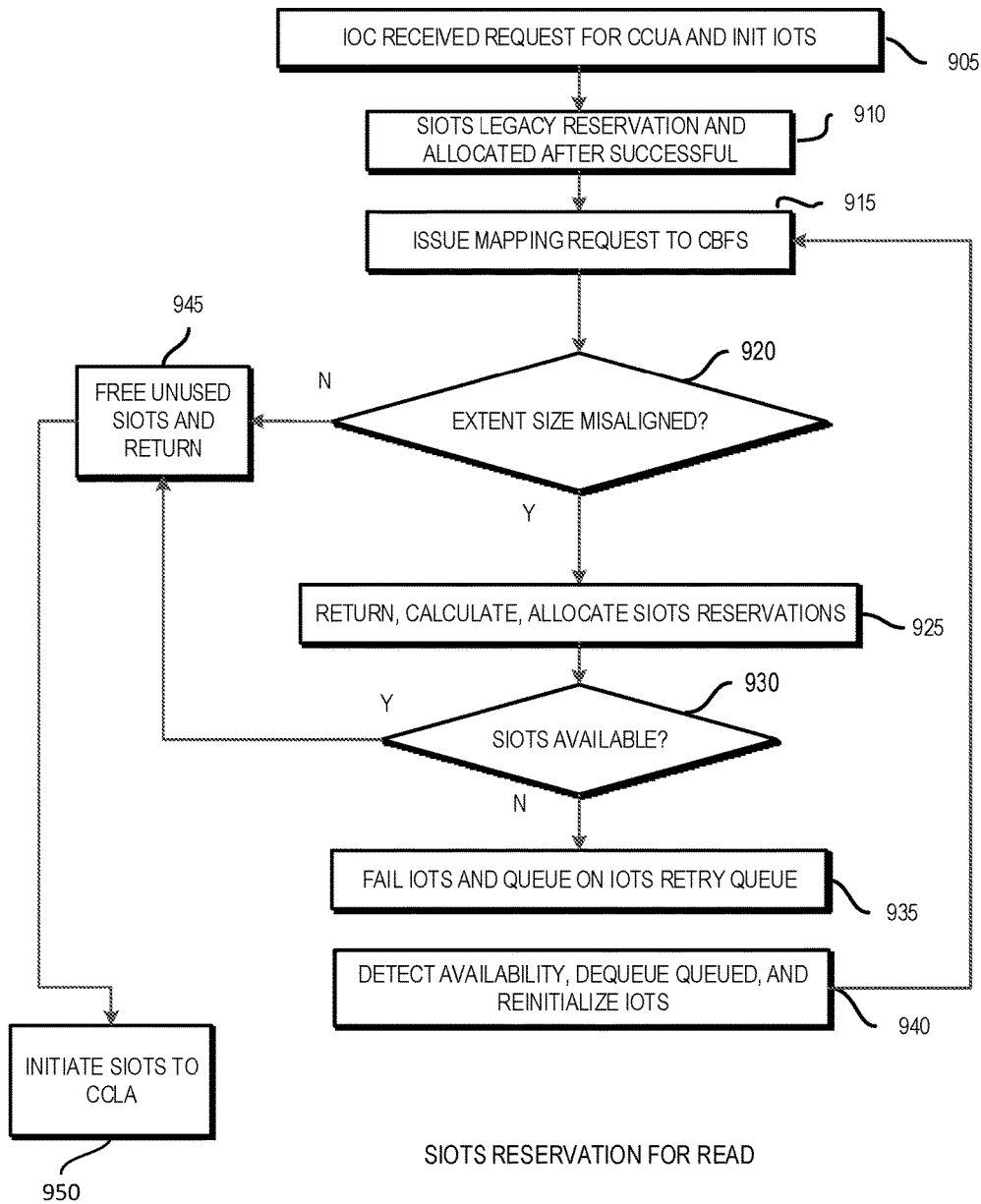
FIG. 10 is a flow diagram describing use of the sub-I/O request tracking structures in connection with read reservations.

FIG. 10 shows the logic associated with use of the SIOTS 90 in connection with a SIOTS reservations for reads. At 905, the IOC 58 receives a reservation request from CCUA 54 and initializes IOTS. At 910, IOTS reservation based onlegacy mapping and IO size and SIOTS allocated from banker after reservation is successfully completed. At 915, a mapping request is issued to the CBFS (CBFS and map 60 are used interchangeably herein). CBFS mapping callback is executed. At 920, a determination is made to determine if extent size is misaligned on CBFS AU size, and if not, at 945, any unused SIOTS are freed and returned back to banker, then SIOTS are initiated to CCLA 56. If at 920 extent size is not misaligned, the read is satisfied by PFDC datalog. At 925, existing SIOTS reservations are returned, new SIOTS reservations are calculated, and an attempt to allocate updated SIOTS reservation from the banker is performed. At 930, a check is performed to see if any SIOTS are available from banker, and if so, at 945, any unused SIOTTS are freed and returned back to banker, then SIOTS are initiated to CCLA 56. If at 930, there are no SIOTS are available from the banker, at 935 the IOTS are internally failed with EMCPAL_STATUS_RETRY and IOTS are queued on the retry queue. At 940, a thread detects availability of SIOTS, dequeues queued IOTS and reinitializes the IOTS and then loops back to 915.

Figure 11:
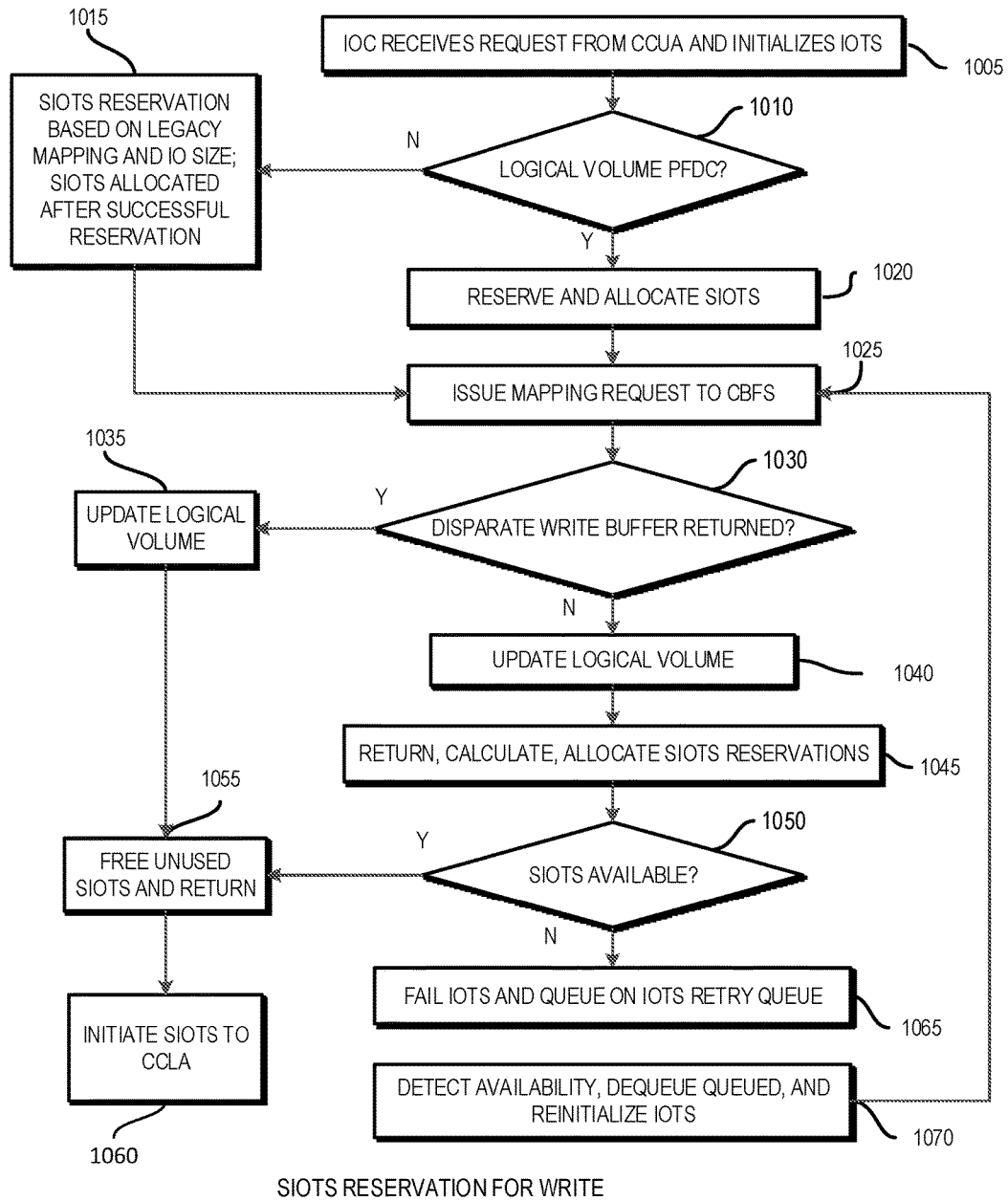
FIG. 11 is a flow diagram describing use of the sub-I/O request tracking structures in connection with read reservations.

FIG. 11 shows the logic associated with use of the SIOTS 90 in connection with a SIOTS reservations for writes. At 1005, the IOC 58 receives a reservation request from CCUA 54 and initializes IOTS. At 1010, an inquiry is made to determine if the logical volume is PFDC enabled, and if not, at 1015, SIOTS reservations are based on legacy mapping and IO size and SIOTS are allocated from the banker after a reservation is successfully performed and then proceeds to 1025. If at 1010 the logical volume is PFDC enabled, at 1020, one SIOTS is reserved for PFDC and one SIOTS is allocated from the banker. At 1025, a mapping request is issued to the CBFS 60 and a CBFS mapping callback is executed. At 1030, if a disparate write buffer is returned by the CBFS, at 1035, the logical volume is updated to indicate PFDC is enabled if previously PFDC disabled, at 1055, any unused SIOTS are freed and returned to the banker, then at 1060, SIOTS are initiated down to CCLA 56.

However, if at 1030, a disparate write buffer is not returned by CBFS, at 1040, the logical volume is updated to indicate PFDC is disabled if previously PFDC enabled. At 1045, existing SIOTS reservations are returned, new SIOTS reservations are calculated, and an attempt to allocate updated SIOTS reservation from the banker is performed. At 1050, a check is performed to see if any SIOTS are available from banker, and if so, at 1035, any unused SIOTTS are freed and returned back to banker, then SIOTS are initiated to CCLA 56. If at 1050, there are no SIOTS are available from the banker, at 1065 the IOTS are internally failed with EMCPAL_STATUS_RETRY and IOTS are queued on the retry queue. At 1070, a thread detects availability of SIOTS, dequeues queued IOTS and reinitializes the IOTS and then loops back to 1025.

While various embodiments of the invention have been particularly shown and described, it will be understood by those skilled in the art that various changes in form and details may be made therein without departing from the spirit and scope of the invention as defined by the appended claims.

What is claimed is:

1. A computer-program product including a non-transitory computer-readable storage medium encoded with computer-program code to process an input/output (I/O) request within data storage circuitry that performs data storage operations on behalf of a host device; the computer-program code, when executed by the data storage circuitry, causing the data storage circuitry to perform a method of:

receiving a set of mappings that maps a set of logical extents identified by the I/O request to a set of storage extents;

performing a comparison operation between the number of mappings in the set of mappings and a number of transfer resources currently available for reservation within the data storage circuitry; and upon completion of the comparison operation, executing a dynamic resource management operation which (i) performs a set of transfer operations that processes all of the mappings in the set of mappings when a result of the comparison operation indicates that the number of mappings in the set of mappings is less than or equal to the number of transfer resources currently available for reservation, and (ii) delays performance of the set of transfer operations when the result of the comparison operation indicates that the number of mappings in the set of mappings exceeds the number of transfer resources currently available for reservation;

wherein data storage circuitry maintains a plurality of sub I/O tracking structures (SIOTs), each SIOT being operable to internally track performance of a respective transfer operation by the data storage circuitry; and wherein performing the comparison operation includes:
generating, as the result of the comparison operation, a first value when the number of mappings in the set of mappings is less than or equal to a number of SIOTs currently available for reservation within the data storage circuitry and a second value that is different from the first value when the number of mappings in the set of mappings exceeds the number of SIOTs currently available for reservation within the data storage circuitry.

2. A method of processing an input/output (I/O) request within data storage circuitry that performs data storage operations on behalf of a host device, the method comprising:

receiving a set of mappings that maps a set of logical extents identified by the I/O request to a set of storage extents;

performing a comparison operation between the number of mappings in the set of mappings and a number of transfer resources currently available for reservation within the data storage circuitry; and upon completion of the comparison operation, executing a dynamic resource management operation which (i) performs a set of transfer operations that processes all of the mappings in the set of mappings when a result of the comparison operation indicates that the number of mappings in the set of mappings is less than or equal to the number of transfer resources currently available for reservation, and (ii) delays performance of the set of transfer operations when the result of the comparison operation indicates that the number of mappings in the set of mappings exceeds the number of transfer resources currently available for reservation;

wherein data storage circuitry maintains a plurality of sub I/O tracking structures (SIOTs), each SIOT being operable to internally track performance of a respective transfer operation by the data storage circuitry; and wherein performing the comparison operation includes:
generating, as the result of the comparison operation, a first value when the number of mappings in the set of mappings is less than or equal to a number of SIOTs currently available for reservation within the data storage circuitry and a second value that is different from the first value when the number of mappings in the set of mappings exceeds the number of SIOTs currently available for reservation within the data storage circuitry.

3. A method as in claim 2 wherein the result of the comparison operation has the first value; and wherein executing the dynamic resource management operation includes:
performing the set of transfer operations that processes all of the mappings in the set of mappings in response to the result of the comparison operation having the first value.

4. A method as in claim 3 wherein performing the set of transfer operations that processes all of the mappings in the set of mappings includes:

transferring data on behalf of the host device to provide the host device with a data storage service that avoids deadlocks.

5. A method as in claim 2 wherein the result of the comparison operation has the second value that is different from the first value; and wherein executing the dynamic resource management operation includes:

delaying performance of the set of transfer operations in response to the result of the comparison operation having the second value.

6. A method as in claim 5, further comprising:

after performance of the set of transfer operations is delayed in response to the result of the comparison operation having the second value, performing another comparison operation between the number of mappings in the set of mappings and an updated number of transfer resources currently available for reservation within the data storage circuitry, and upon completion of the other comparison operation, executing another dynamic resource management operation which performs the set of transfer operations that processes all of the mappings in the set of mappings in response to a result of the other comparison operation indicating that the number of mappings in the set of mappings is less than or equal to the updated number of transfer resources currently available for reservation within the data storage circuitry.

7. A method as in claim 2 wherein the set of logical extents identified by the I/O request defines a particular order for the mappings based on logical addresses of the logical extents; and wherein executing the dynamic resource management operation includes:

performing the set of transfer operations that processes all of the mappings in the set of mappings in accordance with the particular order for the mappings.

8. A method as in claim 7 wherein the set of mappings includes (i) a first mapping that maps a first logical extent to a first storage extent, the first logical extent being addressable by the host device using a first logical address and (ii) a second mapping that maps a second logical extent to a second storage extent, the second logical extent being addressable by the host device using a second logical address that is higher than the first logical address; and wherein performing the set of transfer operations that processes all of the mappings in the set of mappings in accordance with the particular order for the mappings includes:

completing a first transfer operation that accesses the first storage extent using the first mapping ahead of a second transfer operation that accesses the second storage extent using the second mapping based on the second logical address being higher than the first logical address.

9. A method as in claim 8 wherein completing the first transfer operation ahead of the second transfer operation includes:

issuing, to a storage device interface, a first sub-IO request to await a first start transfer callback message as part of the first transfer operation, after issuing the first sub-I/O request, issuing, to the storage device interface, a second sub-IO request to await a second start transfer callback message as part of the second transfer operation, after issuing the second sub-I/O request, receiving an out of order indication from the storage device interface, the out-of-order indication identifying the second transfer operation as having been started ahead of the first transfer operation, and in response to the out of order indication, queuing a retry request for the second transfer operation on a queue to enable completion of the first transfer operation before completion of the second transfer operation.

10. A method as in claim 9 wherein completing the first transfer operation ahead of the second transfer operation further includes:

after queuing the retry request for second transfer operation, completing the first transfer operation, after completing the first transfer operation, de-queing the retry request for the second transfer operation from the queue and processing the retry request to issue, to the storage device interface, another sub-I/O request to await another start transfer callback message as part of the second transfer operation, and after issuing the other sub-I/O request to the storage device interface, completing the second transfer operation.

11. A method as in claim 2 wherein the set of mappings is received from a mapping library coupled with the data storage circuitry; and wherein the method further comprises:

after performing the set of transfer operations that processes all of the mappings, updating the mapping library with updated mappings for the logical extents to indicate that the I/O request has been completed.

12. A method as in claim 2, further comprising:

from the host device, receiving, as the I/O request, a block-based request to access block-based storage of a data storage array which is managed by the data storage circuitry, the block-based request referencing the logical extents.

13. A method as in claim 2, further comprising:

from the host device, receiving, as the I/O request, a file-based request to access file-based storage of a data storage array which is managed by the data storage circuitry, the file-based request referencing the logical extents.

14. Data storage circuitry, comprising:

memory; and control circuitry coupled to the memory, the memory storing instructions which, when carried out by the control circuitry, cause the control circuitry to:

receive a set of mappings that maps a set of logical extents identified by an input/output (I/O) request to a set of storage extents, perform a comparison operation between the number of mappings in the set of mappings and a number of transfer resources currently available for reservation within the data storage circuitry, and upon completion of the comparison operation, execute a dynamic resource management operation which (i) performs a set of transfer operations that processes all of the mappings in the set of mappings when a result of the comparison operation indicates that the number of mappings in the set of mappings is less than or equal to the number of transfer resources currently available for reservation, and (ii) delays performance of the set of transfer operations when the result of the comparison operation indicates that the number of mappings in the set of mappings exceeds the number of transfer resources currently available for reservation;

wherein data storage circuitry maintains a plurality of sub I/O tracking structures (SIOTs), each SIOT being operable to internally track performance of a respective transfer operation by the data storage circuitry; and wherein the control circuitry, when performing the comparison operation, is constructed and arranged to:

generate, as the result of the comparison operation, a first value when the number of mappings in the set of mappings is less than or equal to a number of SIOTs currently available for reservation within the data storage circuitry and a second value that is different from the first value when the number of mappings in the set of mappings exceeds the number of SIOTs currently available for reservation within the data storage circuitry.

15. Data storage circuitry as in claim 14 wherein the result of the comparison operation has the first value; and wherein the control circuitry, when executing the dynamic resource management operation, is constructed and arranged to:

perform the set of transfer operations that processes all of the mappings in the set of mappings in response to the result of the comparison operation having the first value.

16. Data storage circuitry as in claim 14 wherein the result of the comparison operation has the second value that is different from the first value; and wherein the control circuitry, when executing the dynamic resource management operation, is constructed and arranged to: delay performance of the set of transfer operations in response to the result of the comparison operation having the second value.

17. Data storage circuitry as in claim 14 wherein the set of logical extents identified by the I/O request defines a particular order for the mappings based on logical addresses of the logical extents; and wherein the control circuitry, when executing the dynamic resource management operation, is constructed and arranged to:

perform the set of transfer operations that processes all of the mappings in the set of mappings in accordance with the particular order for the mappings.

18. Data storage circuitry as in claim 14 wherein the set of mappings is received from a mapping library coupled with the data storage circuitry; and wherein the control circuitry is further constructed and arranged to:

after performing the set of transfer operations that processes all of the mappings, update the mapping library to indicate that the I/O request has been completed.

* * * * *